Nov. 29, 1960 L. N. REED 2,962,073
RESILIENT MOUNTING FOR A VALVE
STEM ASSEMBLY OR THE LIKE
Filed April 10, 1958
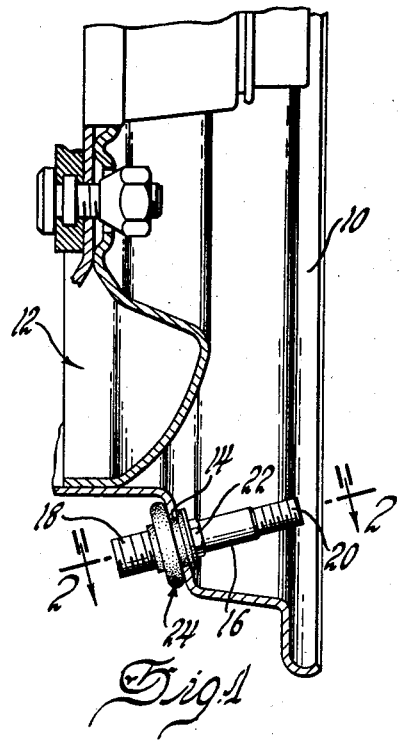
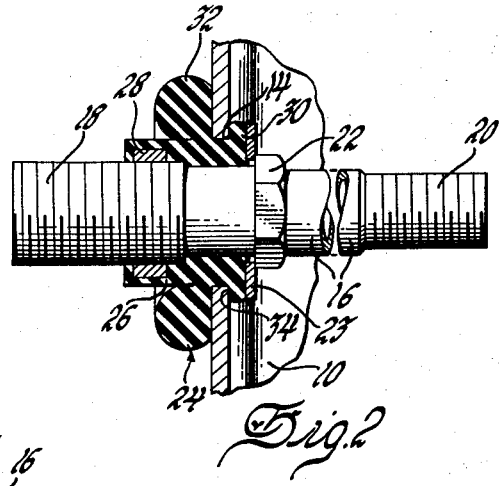
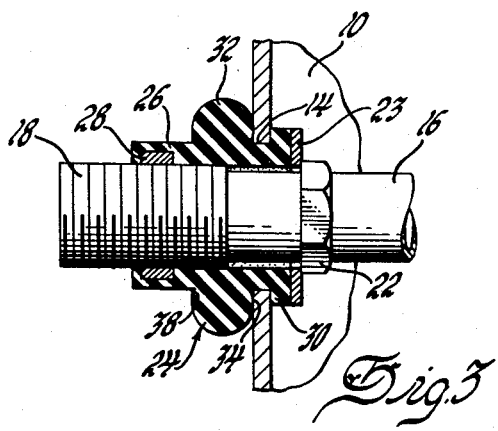
INVENTOR.
Lawrence N. Reed
BY
ATTORNEY ns # United States Patent Office 2,962,073
Patented Nov. 29, 1960

2,962,073

RESILIENT MOUNTING FOR A VALVE STEM ASSEMBLY OR THE LIKE

Lawrence N. Reed, Detroit, Mich., assignor to General Motors Corporation, Detroit, Mich., a corporation of Delaware Filed Apr. 10, 1958, Ser. No. 727,675

6 Claims. (Cl. 152—427)

This invention relates to a self-sealing, resilient mounting assembly particularly adapted for mounting an air pressure supply valve stem on the rim of a wheel adapted to mount a tire of the tubeless type.

The invention contemplates an improved valve stem mounting having dependable sealing characteristics and adapted to permit both valve stem and seal replacement without removal of the tubeless tire from its mounting rim. In accordance with the invention, these objectives are obtained in one illustrative embodiment thereof by providing a deformable resilient anchor member comprising a resilient sleeve having a rigid nut carried by one end thereof, an annular resilient flange adjacent the other end and a radially enlarged flange intermediate said first flange and the nut. The second flange is of a cross-section defining the major portion of a toroid. The two flanges define a groove therebetween adapted to engage the surfaces defining a valve stem mounting aperture in the wheel rim. Axial compression of the resilient sleeve intermediate its flanged and nut carrying ends is caused by tightening a valve stem externally threaded adjacent its end and projecting within the wheel rim and tire relative to the rigid nut; the valve stem being flanged intermediate its ends to axially engage the flanged end of the resilient sleeve. Such axial compression causes deflective rolling of the second flange on the adjacent portion of the sleeve thereby compressively loading the sleeve radially inwardly into sealing and locking contact with the valve stem.

The foregoing and other objects, advantages and features of the invention will be more thoroughly understood from the following description of the illustrative embodiment thereof, having reference to the drawing wherein:

Figure 1 is a sectional view of a portion of a vehicle wheel adapted to mount a tubeless tire and showing a valve stem assembly mounted therein in accordance with the invention;

Figure 2 is an enlarged sectional view taken substantially on the line 2—2 of Figure 1 and showing the details of the valve stem mounting in greater detail upon substantial tightening of the valve stem; and Figure 3 is a view similar to Figure 2 showing the mounting prior to final tightening of the valve stem.

Referring more particularly to Figure 1, the tire mounting rim 10 of the wheel assembly 12 has an aperture 14 which spacedly embraces a hollow air valve mounting stem 16 resiliently mounted therein by a deformable resilient nut assembly or member 24 which is constructed in accordance with the invention. The valve stem 16 is externally threaded, as indicated at 18, adjacent its end projecting within the air chamber formed intermediate the wheel rim and the tire and is externally threaded at its opposite end, as indicated at 20, to threadably mount a conventional closure cap, not shown. Intermediate its ends, the valve stem member is provided with a hexagonally headed flange 22 which is engageable by a tightening wrench and provides a washer engaging shoulder facing the aperture of the wheel rim.

As best seen in Figures 2 and 3, the inner end of the valve stem 16 threadably engages a portion of the deformable resilient nut assembly 24. The nut assembly 24 includes a deformable resilient sleeve or cylinder 26 having a rigid internally threaded nut 28 cast into or otherwise attached adjacent one end thereof. An annular flange 30 is formed integrally with and extends radially outwardly from the opposite end of the sleeve 26 and a second annular flange or grommet 32 is formed integrally of and extends radially outwardly of the sleeve 26 intermediate the nut 28 and the flange 30. The flange 32 which extends circumferentially about the sleeve 26 is substantially toroidal in shape, defining in radial cross-section the major portion of a toroid generating circle. The end flange 30 and the grommet 32 cooperate to define an annular groove 34 adapted to engage the aperture defining surfaces of the wheel rim, the inner diameter of the groove 34 being substantially the diameter of the aperture 16.

The resilient nut assembly 24 is preferably so proportioned that the sleeve 26 may be radially collapsed sufficiently to permit its insertion in the aperture 14 from either the radially inner or outer sides of the wheel rim. Since the end flange 30 is of substantially smaller diameter than the outer diameter of the grommet flange 32, such insertion of the nut assembly through the rim aperture is obviously more easily accomplished from the tire cavity side of the rim if the tire is not mounted therein. However, the tire, and in some cases the wheel, need not be removed from the vehicle to make such an insertion.

After insertion of the resilient nut assembly in the aperture 14, the valve stem 16 is threaded through the nut assembly until a washer 23 embracing the stem 16 is carried into engagement with the flange end of the sleeve 26 by the flange 22. Further rotation of the valve stem threadably shifts the rigid nut 28 to the right as shown in the drawing thereby compressing the resilient sleeve 26 axially intermediate nut 28 and the washer 23. This causes compressive loading of the flange 30 intermediate the rim 10 and the washer 23 extruding this portion of the sleeve radially inwardly to sealingly engage the reduced diameter surface of the valve stem intermediate the flange 22 and the threaded end portion 18. Such axial compression of the sleeve 26 also results in axial loading of the grommet 32 by the wheel rim. Due to the axially facing groove indicated at 38 which is provided by the configuration of the grommet 32, this axial loading of the grommet 32 results in its axial deflection relative to the aforeshortened sleeve effectively rolling it along the outer surface of the sleeve thereby exerting a radially inwardly compressive force effectively sealing and locking the sleeve with respect to the threads of the valve stem and the reduced diameter portion thereof intermediate the threads and the flange 22.

It will be noted that while the resilient nut assembly 24 alone can be axially inserted in the aperture 14 when the valve stem is extended therethrough, the completed assembly cannot be removed from the aperture.

While the foregoing description has been limited to one specific embodiment of the invention, it will be obvious to those skilled in the art that various modifications might be made therein and its adaptation to other applications might be made without departing from the spirit and scope of the invention as defined in the following claims.

I claim:

1. A valve stem mounting assembly for a tubeless tire comprising in combination, a wheel rim having an aperture therein, a hollow valve stem extending through said aperture in spaced relation thereto, said valve stem being externally threaded at at least one end thereof and having a flange thereon intermediate its ends engageable by a tightening device and defining a radially extending annular shoulder facing said threaded end, and a deformable resilient anchor member extending axially through said aperture, said anchor member including a resilient sleeve having a first resilient annular flange at one end thereof, an internally threaded non-resilient nut portion adjacent the opposite end thereof, and a second resilient annular flange formed intermediate said first resilient flange and said non-resilient portion and cooperating with said first resilient flange to define a groove adapted to engage said wheel rim adjacent said aperture, said second annular flange being undercut to define an annular groove facing said opposite end of said anchor member whereby tightening of said valve stem relative to said non-resilient nut portion causing axial compression of said anchor member between said nut portion and said stem flange and said wheel rim causes rolling of the second flange toward said nut portion to exert a radially inwardly compressive loading of the sleeve portion on the valve stem.

2. A valve mounting for a tubeless tire comprising in combination, a wheel rim having an aperture therein, a hollow valve stem member extending through said aperture in spaced relation thereto, said valve stem member being externally threaded at at least one end therof and having a flange thereon intermediate its ends engageable by a tightening device and defining a radially extending shoulder facing said threaded end, and a deformable resilient assembly extending axially through said aperture and resiliently mounting said valve stem member with respect thereto, said assembly including a resilient sleeve having a first resilient flange at one end, an internally threaded rigid nut carried adjacent the opposite end thereof and threadable on said valve stem member, and a second annular flange formed intermediate said first resilient flange and said rigid nut and cooperating with said first resilient flange to define a groove adapted to engage said wheel rim adjacent said aperture, said second annular flange defining the major portion of a toroid whereby tightening of said valve stem relative to said rigid nut causing axial compression of said anchor member intermediate said nut and said valve stem flange causes said wheel rim to deflect the second flange axially and radially inwardly to exert a compressive loading sealing and locking the sleeve with respect to the valve stem.

3. A resilient valve stem mounting assembly for a tubeless tire comprising a resilient sleeve having a first resilient flange at one end, an internally threaded non-resilient nut portion adjacent the opposite end thereof threadable on a hollow valve stem member adapted to be mounted thereby, and a second annular flange formed intermediate the ends of said sleeve and spaced axially from said non-resilient portion and cooperating with said first flange to define a groove adapted to engage a tire mounting wheel rim adjacent a mounting aperture formed therein, and said second annular flange being undercut to define an annular groove opening toward the end of said sleeve carrying said non-resilient nut portion whereby axial compression of said resilient assembly by tightening of the valve stem with respect to the non-resilient nut portion causes the wheel rim to deflect the second flange axially and inwardly into contact with the adjacent portion of said sleeve thereby exerting a radially inwardly compressive loading on the sleeve sealing and locking the valve stem in its tightened position.

4. A resilient mounting assembly comprising a mounting member having an aperture therein, a bolt member externally threaded at one end thereof and having a radially extending shoulder thereon facing said threaded end, and a deformable resilient anchor member extending axially through said aperture, said anchor member including a resilient sleeve having a non-resilient portion adjacent one end thereof and threadable on said bolt member, a resilient flange adjacent the opposite end thereof, and a second annular flange formed intermediate the ends of said sleeve in axially spaced relation to said non-resilient portion and cooperating with said first flange to define a groove adapted to engage said mounting member adjacent said aperture, and said second annular flange defining the major portion of a toroid whereby tightening of said bolt member relative to said non-resilient portion causing axial compression of said anchor member between said non-resilient portion and said bolt member shoulder causes said mounting member to deflect the second flange axially and inwardly into rolling contact with the sleeve thereby compressively loading the sleeve radially inwardly into sealing and locking engagement with the bolt member.

5. A resilient mounting assembly comprising a mounting member having an aperture therein, a mounted member having a portion thereof extending through said aperture in spaced relation thereto, and a deformable resilient sleeve member extending axially through said aperture and embracing said extending portion of said mounted member, said resilient sleeve member having a first resilient annular flange intermediate the ends thereof and a second resilient annular flange spaced from said first flange and cooperating therewith to define a groove adapted to engage said mounting member adjacent said aperture, said first annular flange defining the major portion of a toroid and providing annular grooves facing both ends of said sleeve member, and means for causing axial compression of said sleeve member intermediate its ends whereby said first flange is deflected by said mounting member into rolling engagement with the adjacent portions of said sleeve member thereby compressively loading the adjacent sleeve portions radially inwardly into sealing and locking engagement with the portion of the mounted member extending therethrough.

6. A resilient mounting member comprising a resilient sleeve portion adapted to receive a portion of a mounted member, said sleeve portion having a first resilient annular flange at one end thereof and a second resilient annular flange spaced intermediate the ends of said sleeve portion and cooperating with said first flange to define a groove adapted to engage a mounting member adjacent an aperture formed therein, and said second annular flange being undercut to define an annular groove facing the end of said sleeve portion opposite said first flange whereby axial compression of the mounting member intermediate its ends causes deflection of the second flange axially and inwardly into circumferential contact with the adjacent sleeve portion to exert a radially inwardly compressive loading of the adjacent sleeve portion on the portion of the mounted member extending therein.

References Cited in the file of this patent
UNITED STATES PATENTS

| | | |
|---|---|---|
| 1,915,249 | Jorgensen | June 20, 1933 |
| 2,277,885 | Rodanet | Mar. 31, 1942 |
| 2,481,142 | Muller et al. | Sept. 6, 1949 |
| 2,872,963 | Boyer | Feb. 10, 1959 |

FOREIGN PATENTS

| | | |
|---|---|---|
| 1,117,950 | France | Mar. 5, 1956 |